March 19, 1935. O. H. BANKER 1,994,631

VEHICLE TRANSMISSION MECHANISM

Filed Jan. 29, 1932 2 Sheets-Sheet 2

Inventor
Oscar H. Banker
By Searles & French
Attorneys

Patented Mar. 19, 1935

1,994,631

UNITED STATES PATENT OFFICE 1,994,631

VEHICLE TRANSMISSION MECHANISM

Oscar H. Banker, Chicago, Ill., assignor to New Products Corporation, Chicago, Ill., a corporation of Delaware Application January 29, 1932, Serial No. 589,608

1 Claim. (Cl. 192—48)

The invention relates to vehicle transmission mechanisms.

One object of the invention is to provide a transmission mechanism for automotive vehicles wherein the free wheeling device is interposed between the engine clutch and the change speed gear set so that the free wheeling device only has to resist the mechanical torque conditions of the motor and does not have to take the multiplied torque of the motor as is the case with those free wheeling devices that are mounted behind the transmission. This arrangement also permits the operator to free wheel in any speed or reverse and has the advantage of eliminating any necessity for mechanisms for locking the free wheeling device to accomplish the reverse. A further advantage is that where the free wheeling device is located as in accordance with the present invention, the overall length of the transmission is reduced from that of known devices.

A further object of the invention is to provide a construction in which the one way roller clutch free wheeling mechanism is adapted to be mounted on that end of the drive shaft of the change speed device that projects from the front of the gear box and usually has the driven element of the engine clutch secured thereto.

The invention further consists in the several features hereinafter set forth and more particularly defined by the claim at the conclusion hereof.

Figure 1:
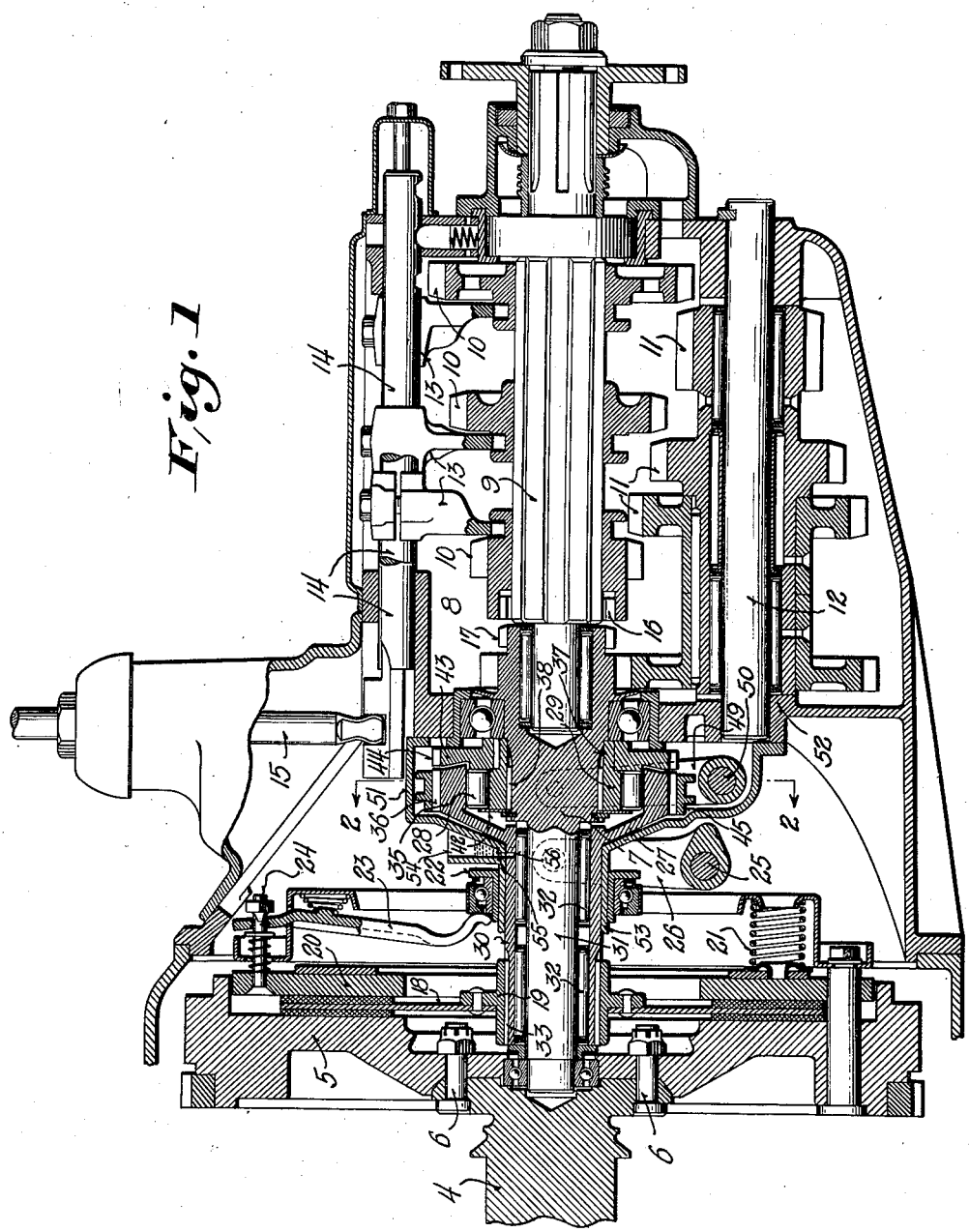
Figure 2:
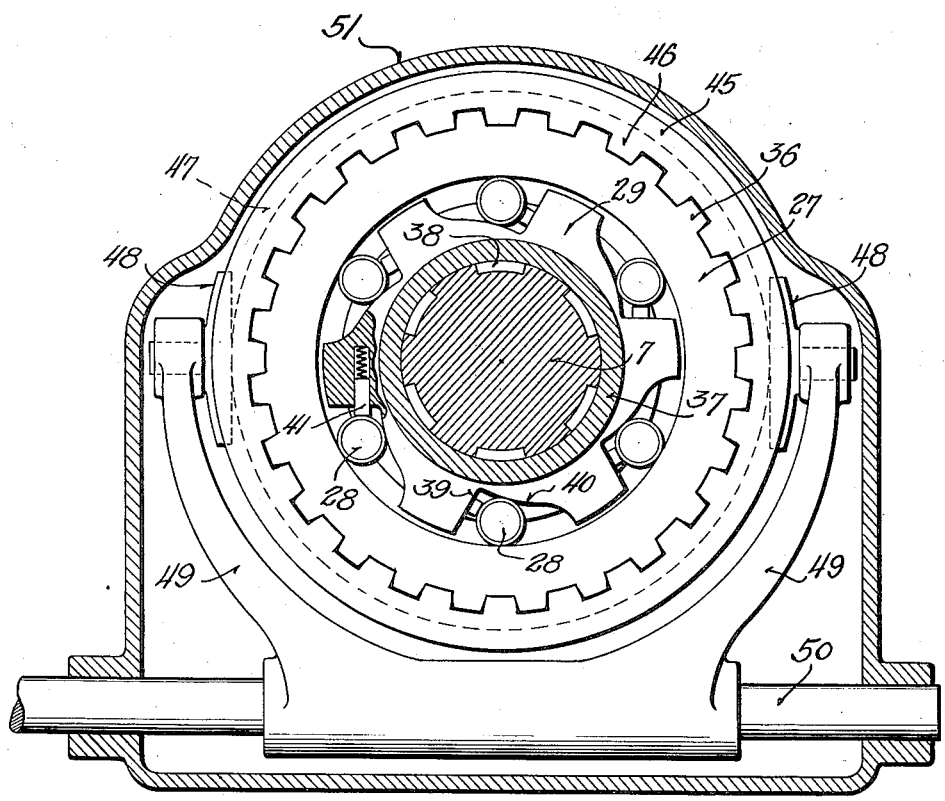

In the drawings; Fig. 1 is a vertical sectional view through a transmission mechanism embodying the invention;

Fig. 2 is a detail vertical sectional view taken on the line 2—2 of Fig. 1.

Referring to the drawings, the numeral 4 designates the engine shaft, 5 the flywheel secured to the shaft 4 by the bolts 6, 7 the main drive shaft for the change speed gear mechanism 8, which shaft also usually forms the driven element of the engine clutch.

Any suitable change speed gear mechanism may be used and for the purpose of illustration I have shown one well known form of such mechanism in which the shaft 9 has the shiftable change speed gears 10 slidably splined thereto and adapted to be selectively moved into mesh with the gears 11 on the shaft 12 through the shifter forks 13 that are mounted on shifter shafts 14 under the selective control of the operator through the gear shift lever 15, one of the gears 10 also having a jaw clutch gear 16 movable into mesh with a clutch gear 17 on the inner end of the shaft 7 for direct drive.

The engine clutch may be of any suitable construction but for the purpose of simplicity I prefer a clutch of the single plate type and have accordingly shown a known form of clutch construction, the details of which do not form a part of the present invention, said clutch embodying a disk or plate element 18 having a hub 19, a slidable pressure plate 20 associated with the usual pressure springs 21 (one being shown) and the release mechanism which includes the shift collar 22, the pivoted release lever 23 operatively connected to a bolt 24 connected to the pressure plate 20 so that when the collar 22 is moved toward the left by the operator, through his control or actuation of the oscillatory shaft 25 and the fork 26 secured thereto and engageable with said collar, the pressure of the plate 20 through the springs 21 will be relieved from the plate element 18 and the engine will be disconnected from the transmission in the usual manner.

Thus while the engine clutch and transmission mechanism herein shown are of conventional design they are associated with the free wheeling mechanism now to be described in a novel manner.

The free wheeling mechanism embodies a one way roller clutch which includes a driving element 27, the clutch rollers 28 and driven element 29.

The driving element 27 has a hub portion 30 in the form of a sleeve shaft which is free to rotate relative to the forward extension 31 of the main drive shaft 7 on the roller bearings 32 interposed between these shafts and which has the hub 19 of the engine clutch keyed thereto by a splined connection 33 therewith. This element also has a drum portion 35 whose outer periphery is provided with clutch teeth 36, the inner side of the drum being plane and adapted to frictionally engage the clutch rollers 28.

The driven element 29 has its hub 37 secured to the shaft 7 just outside of the gear box by a splined connection 38 with said shaft and is provided with wedging recesses 39 in which the clutch rollers 28 work and are adapted to be wedged by the inclined or wedging surfaces 40 of the recesses into holding engagement therewith and with the drum in one direction of rotation and to be released from the drum 35 in case the shaft 7 runs faster than said drum, each of said rollers being normally urged toward clutched position by a spring pressed plunger 41 and being retained against free end movement by a plate 42.

Fixed to the hub 37 of the driven element 29 is a clutch member 43 whose teeth 44 are adapted to be alined with the teeth 36 of the driving element 27 and when so alined the two relatively movable parts of the clutch may be directly connected together by the shiftable clutch member 45 which has the teeth 46 adapted to mesh with the teeth 44 and 36 for this purpose or to mesh with the teeth 36 and rotate freely with the driver 27 when it is desired to free wheel. For controlling the member 45 the same is provided with an annular groove 47 in which the pivoted blocks 48 of the shifter fork 49 engage, said fork being mounted on a control shaft 50 adapted to be connected in any suitable manner for operation by the operator.

With the above construction with the parts in the position shown in Fig. 1, the free wheeling mechanism is operative so that the operator of the vehicle may free wheel in any speed, forward or reverse that may be determined by the gear set and then in order to place the vehicle in normal driving operation the operator through the oscillation of the shaft 50 and the shifter fork 49 may move the clutch member 45 so that it engages both the teeth 44 and 36 in which event the drive from the engine proceeds through the engine clutch to the element 27, members 45 and 43, element 29 to the main drive shaft 7 of the change speed gear mechanism.

The main parts of the free wheeling mechanism are enclosed in a casing 51 which is secured to the front of the change gear housing 52 and fits over the hub or sleeve portion 30 so that all parts of the one way clutch mechanism may run in oil which is separately supplied and the shifting collar 22 for the engine clutch is slidably mounted on a sleeve portion 53 of the casing 51. For supplying the interior of the casing 51 with lubricant a part thereof is formed to provide a chamber 54 with a passage 55 at its lower end alined with one or more holes 56 in the hub 30 by which the oil is conducted to the spaces between said hub 30 and the shaft 31 and then works its way along the shaft 31 and into the casing 51 where it is thrown out by centrifugal force against the rollers 28 and other parts therein. The chamber 54 is supplied with lubricant from any suitable source.

I desire it to be understood that this invention is not to be limited to any particular form or arrangement of parts except in so far as such limitations are included in the claim.

What I claim as my invention is:

In a vehicle transmission mechanism having a gear housing, a transmission drive shaft having a part extending from said housing, and an engine clutch including a driven element, an overrunning clutch comprising a driving and a driven element and a releasable driving element therebetween, said first-named driving element having a sleeve shaft portion mounted to rotate with and relative to said transmission drive shaft and connected to the driven element of the engine clutch, a housing for said overrunning clutch having a sleeve extension, and control mechanism for said engine clutch including a shiftable member mounted on said sleeve extension.

OSCAR H. BANKER.